Jan. 30, 1951     C. McCLINTOCK     2,539,693
RETRACTABLE RUNNING GEAR FOR BOAT TRAILERS
Filed July 25, 1947     2 Sheets-Sheet 1
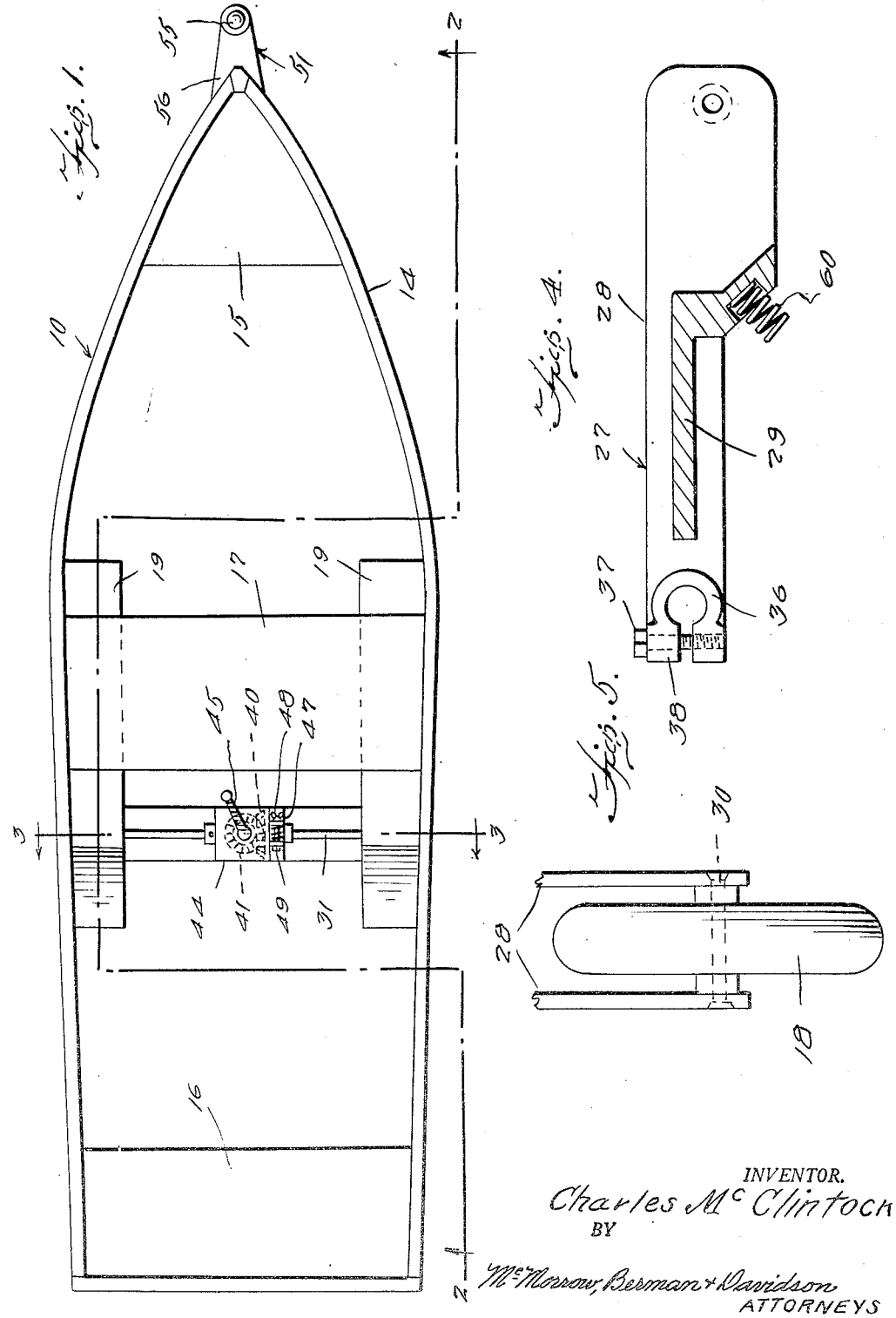
INVENTOR.
Charles McClintock
BY
McMorrow, Berman & Davidson
ATTORNEYS

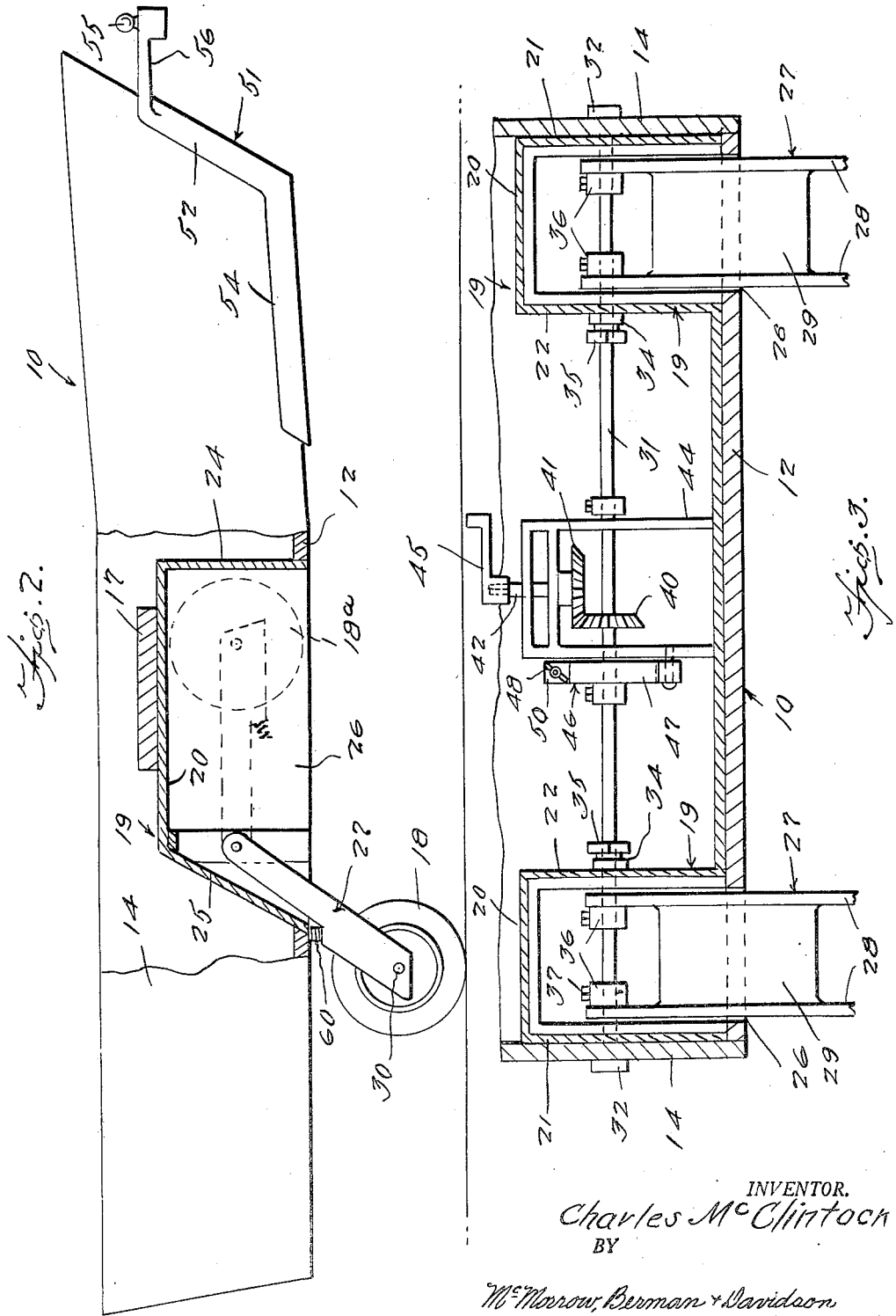

Patented Jan. 30, 1951

2,539,693

UNITED STATES PATENT OFFICE 2,539,693

RETRACTABLE RUNNING GEAR FOR BOAT TRAILERS

Charles McClintock, Flint, Mich.

Application July 25, 1947, Serial No. 763,500

1 Claim. (Cl. 9—1)

This invention relates to boats, and more particularly to a boat having a retractable running gear for trailing the boat behind a vehicle on a road.

For transporting small boats from one body of water to another has necessitated the use of a trailer or the like on which the boat may be supported by attaching the trailer to a car or other vehicle. The use of such trailers burdens the owner of the boat with the cost of a specially constructed trailer which has no other use than that of transporting the boat. Even with the use of such a trailer, the boat must be carried by hand from the trailer to the water, and back to the trailer when the boat is to be transported to another place. It is an object of this invention to provide a boat having the running gear or wheels mounted thereon so that the expense of a special trailer will be obviated and the boat may be wheeled directly into the water.

Another object of this invention is to provide a boat of the kind to be more particularly described hereinafter having a pair of retractable wheels mounted thereon which may be readily extended or retracted by an operator within the boat while the boat is floating.

Still another object of this invention is to provide a boat of this kind having a trailer hitch fixedly secured to the front end or bow of the boat so that the craft may be readily connected to an associated hitch or drawbar on the vehicle behind which the boat is to be drawn.

A further object of this invention is to provide a boat having a retractable running gear actuated by and connected to a rotatable shaft within the boat having means by which the shaft may be rotated for raising and lowering the wheels from within the boat, and a brake for said shaft for holding the shaft against rotation and the running gear from retraction or extension and for locking the running gear in either extreme or any selected intermediate position.

With these and other objects which will become apparent in the specification and drawings in mind, it is understood that the particular arrangement, combination and construction disclosed is a preferred form of this invention, to be limited only by the scope of the appended claim.

In the drawings:

Figure 1 is a top plan view of a boat having a retractable running gear constructed according to an embodiment of my invention.

Figure 2 is a side elevation, partly broken away, and partly in section, taken substantially on the line 2—2 of Figure 1.

Figure 3 is a transverse section, partly broken away, taken on the lines 3—3 of Figure 1.

Figure 4 is a detailed longitudinal section of a running gear supporting arm removed from the assembly.

Figure 5 is a front elevation, partly broken away, of the wheel and axle mounting.

Referring to the drawings, the numeral 10 designates generally a boat hull having a pair of retractable wheels mounted thereon so that the boat may be drawn by a vehicle when the wheels are extended and may be floated normally when the wheels are retracted. The boat 10 is formed of a body 11 having a substantially flat bottom 12 and upwardly extending sides 14.

The sides 14 and bottom 12 are bowed toward the front end similar to the style and design of a conventional row boat. The boat 10 is provided with a seat 15 in the apex of the prow, a seat 16 in the extreme stern and a center or middle seat 17 intermediate the length of the boat. The seats 15, 16, and 17 are spaced upwardly from the bottom 12 of the boat 10.

The retractable running gear is disposed at substantially the center of the length of the boat 10 under the middle or center seat 17. The wheels 18 of the running gear are adapted to be housed, in their retracted position, in housings on opposite sides of the boat inwardly of the sides 14 so that the gear will be enclosed within the confines or the edges of the boat.

The wheel housings 19 are disposed on opposite sides of the boat 10 adjacent the sides 14. The housings 19 are substantially U-shaped in cross-section having a top upper wall 20 and downwardly extending side walls 21 and 22. The outer side walls 21 are made to engage and conform to the contour of the sides of the boat, whether straight or curved walls are used. The bottom edges of the side walls 21 and 22 are fixedly secured to the bottom 12 and are sealed thereagainst. The inner walls 22 are connected together by a bottom connecting piece which overlies the bottom of the boat. Both housings and the bottom connecting piece may be formed integral to add strength to the structure. The housing 19 is completed by a forward wall 24 and a rear wall 25 extending between the side walls 21 and 22 and the upper wall 20 and bottom 12. The bottom 12 of the boat 10 is formed with openings 26 bounded by the lower edges of the side walls of the housing 19 through which the wheels and their supporting struts may be extended.

The wheels 18 are rotatably mounted on the lower end of struts or arms 27 which are in turn rockably mounted in the rear end of the housings 19. The arms 27 are formed of an I-shaped member having parallel side flanges 28 connected together by a center web 29. The flanges 28 extend beyond the web 29 at both ends of the web 29 for the connection of the wheel axles and the retracting gear actuating shaft. The wheels 18 are secured to the strut 27 by axles 30 rotatably carried by the lower extensions of the flanges 28.

The retracting gear actuating shaft 31 extends across the boat 10 below the seat 17 being rotatably journaled in the walls of the housings 19 and extending transversely through the rear end of the housings. The outer ends of the shaft 31 are carried by bearings or bushings 32 in the outer walls 21 of the housings 19. The bushings 32 are closed on the outer end to seal the outer wall 21 against the admission of water into the boat. The shaft 31 is journaled through the inner walls 22 of the housings 19 by a through bushing 34 and a packing gland nut 35 about the shaft 31 seals the inner bushing 34 from the admission of water while permitting the shaft 31 to rotate freely therein.

The upper end of the strut 27 is fixedly secured to the shaft 31 in the housing 19 by a split sleeve or clamp 36 carried by the upper ends of the flanges 28. A bolt or screw 37 engages through the ears 38 of the split clamp 36 for tightening the clamp and arm 27 on the shaft 31.

For rotating the operating shaft 31 in its bearings a ring gear 40 is fixedly secured to the shaft intermediate its length between the housings 19. A pinion 41 engages with the ring gear 40 and is fixed on a shaft 42. The gears 40 and 41 are enclosed in a gear box 44 below and behind the center seat 17 in the boat 10. The shaft 42 on the pinion 41 extends upwardly from the gear box 44 and a crank handle 45 is removably engaged thereon.

Rotation of the crank handle 45 will through gears 40 and 41 effect rotation of the shaft 31 and cause the arms 27 to be pivoted about the axis of the shaft for raising or lowering the wheels 18.

A brake 46 is provided for holding the shaft 31 and struts 27 in a selected position. A brake drum is fixedly carried by the shaft 31 and a split brake band 47 loosely engages about the drum. The brake band is secured to the gear box 44 to hold the band against rotation, and a wing nut 48 engages about a bolt 49 carried by the ears 50 of the ends of the band 47. The tension of the band 47 on the brake drum is readily adjusted by the wing nut 48.

A trailer hitch 51 is fixedly secured to the front end or bow of the boat 10 for attaching the boat with its extended running gear behind a vehicle. The trailer hitch 51 is formed of a strip of metal 52 which extends upwardly from the bottom of the prow of the boat along the forward edge thereof. Rearwardly extending arms 54 are secured to the bowed sides of the bottom of the boat and extend rearwardly from the forward vertical strip or arm 52. A coupling member 55 is fixed to the arm 56 which extends forwardly from the upper end of the arm 52, and is adapted to be engaged with a correlated coupling member of a vehicle or drawbar for pulling the boat.

In the use and operation of this running gear, when the boat 10 is afloat and the brake 46 released the wheels 18 may be lowered from their retracted position indicated by the numeral 18a. Rotation of the handle 45 will rotate the gears 41 and 40 and the shaft 31. As the shaft 31 is rotated the struts 27 will be pivoted from their horizontal forwardly extending position to their extended or downwardly and rearwardly inclined position as shown in Figure 2 in full lines.

Tightening the wing nut 48 will brake the shaft 31 and running gear in the extending position. The vibration and bouncing of the boat 10 on the wheels 18 over roads is absorbed by a spring 60 fixedly carried by the strut 27 and engageable with the bottom 12 of the boat rearwardly of the opening 26 in the extended position of the gear.

While the preferred form of this invention is described herein, it is understood that various changes in construction and modifications may be made without departing from the scope of the invention as pointed out in the appended claim.

What is claimed is:

A combined boat and trailer comprising a hull including spaced upstanding sides and a substantially flat bottom having a pair of laterally spaced opposed elongated openings, a pair of upstanding housings mounted upon the bottom and covering the openings and having open bottoms arranged in registration with the openings, a transverse substantially horizontal base plate mounted upon the bottom and having its opposite ends connected with the housings for forming a unitary structure, a gear box secured to the base plate between the housings, a transverse substantially horizontal drive shaft spaced above the base plate and extending transversely through the housings and gear box and journaled upon the housings, gearing arranged within the gear box and connected with the drive shaft for rotating it, a friction brake device connecting the drive shaft and gear box for regulating the rotation of the drive shaft, arms secured to the drive shaft and disposed within the housings and swingable through the openings of the bottom to extended and retracted positions when the drive shaft is turned, and wheels rotatably mounted upon the arms near their free ends for engaging the ground to support the boat thereabove when the arms are extended, the extended arms being inclined with respect to the substantially flat bottom and including parts engaging beneath the bottom for directly connecting the arms and bottom when the arms are extended.

CHARLES McCLINTOCK.

REFERENCES CITED

The following references are of record in the file of this patent:

UNITED STATES PATENTS

| Number | Name | Date |
|---|---|---|
| 28,979 | Gerard | July 3, 1860 |
| 1,442,155 | Klemin | Jan. 16, 1923 |
| 2,026,885 | Goddard | Jan. 7, 1936 |
| 2,283,648 | Samdahl | May 19, 1942 |
| 2,370,508 | Wilkie | Feb. 27, 1945 |

FOREIGN PATENTS

| Number | Country | Date |
|---|---|---|
| 739,678 | France | Jan. 16, 1933 |